(12) United States Patent
Wen et al.

(10) Patent No.: US 10,903,674 B2
(45) Date of Patent: Jan. 26, 2021

(54) POWER CONVERTER MODULE

(71) Applicant: National Chung-Shan Institute of Science and Technology, Taoyuan (TW)

(72) Inventors: Shu-Hsien Wen, Taoyuan (TW); Chih-Hsien Chung, Taoyuan (TW); Jin-Kuan Chang, Changhua County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 128 days.

(21) Appl. No.: 16/223,072

(22) Filed: Dec. 17, 2018

(65) Prior Publication Data

US 2020/0195148 A1 Jun. 18, 2020

(51) Int. Cl.
*H02J 7/00* (2006.01)
*H02J 7/06* (2006.01)
*H02J 7/02* (2016.01)
*H02J 7/10* (2006.01)

(52) U.S. Cl.
CPC ...... *H02J 7/007192* (2020.01); *H02J 7/0022* (2013.01); *H02J 7/022* (2013.01); *H02J 7/06* (2013.01); *H02J 2007/10* (2013.01); *H02J 2207/20* (2020.01)

(58) Field of Classification Search
CPC .......... H02J 3/381; H02J 1/10; H02J 2300/20; H02J 3/382; H02J 1/00; H02J 1/14; H02J 7/34; H02J 7/022; H02J 2207/20; H02J 3/32; H02J 7/02; H02J 7/14; H02J 2300/24; H02J 3/383; H02J 5/00; H02J 7/0014; H02J 7/0024; H02J 7/345; H02J 2300/26; H02J 3/005; H02J 3/385; H02J 7/00; H02J 7/0068; H02J 7/00711; H02J 7/0091; H02J 7/35; H02J 9/061; H02J 9/062; H02J 2007/10; H02J 2310/48; H02J 3/00125; H02J 3/01; H02J 3/1842; H02J 3/1864; H02J 3/30; H02J 3/38; H02J 7/0022; H02J 7/0027; H02J 7/0029; H02J 7/0031; H02J 7/007192; H02J 7/06; H02J 7/1423;

(Continued)

(56) References Cited

U.S. PATENT DOCUMENTS

| | | | |
|---|---|---|---|
| 2015/0137607 A1* | 5/2015 | Agarwal | H02M 3/07 307/77 |
| 2016/0149413 A1* | 5/2016 | Sugimoto | H02J 3/1842 307/20 |
| 2016/0380455 A1* | 12/2016 | Greening | H02J 1/00 320/114 |

* cited by examiner

*Primary Examiner* — Binh C Tat
(74) *Attorney, Agent, or Firm* — Winston Hsu

(57) ABSTRACT

A power conversion system comprises a plurality of power converter modules, each including a bi-directional DC to DC converter and a current controller, wherein the bi-directional DC to DC converter is connected to the current controller, for charging or discharging a DC power source according to a distribution command received from the current controller, and a voltage controller, connecting to the plurality of power converter modules, for generating a current command to the current controller, wherein the voltage controller generates a current command to the current controller of the power converter module according to the detected capacity and voltage of the DC power source, whereby the current controller generates the distribution command to the bi-directional DC to DC converter with the received current command.

15 Claims, 10 Drawing Sheets

(58) Field of Classification Search
CPC ....... H02J 7/24; H02J 9/066; B60L 2240/427; B60L 2220/16
USPC .................................................. 320/126–136
See application file for complete search history.

(a)

(b)

(a)

(b)

(a)

(b)

(a)

(b)

POWER CONVERTER MODULE

BACKGROUND OF THE INVENTION

1. Field of the Invention

The present invention relates to a power converter, and more particularly, to a power converter module with an inner current loop for controlling a DC to DC converter.

2. Description of the Prior Art

Conventional power conversion system is illustrated in FIG. 1. As shown in FIG. 1, the power conversion system 1 includes a DC power source 11 (e.g. a battery), an AC power source 15, a DC to DC converter 12, a filter capacitor 13 and a DC to AC inverter 15. The DC to AC inverter 15 is controlled by a controller for charging or discharging the DC power source 1. The controller is designed in an outer loop, which includes a current controller and a voltage controller. However, this outer loop control structure requires more response time if multiple DC power sources are in the power conversion system.

SUMMARY OF THE INVENTION

It is therefore an objective to provide a power converter module to solve the above problem.

The present invention discloses a power conversion system. The power conversion system comprises a plurality of power converter modules, each including a bi-directional DC to DC converter and a current controller, wherein the bi-directional DC to DC converter is connected to the current controller, for charging or discharging a DC power source according to a distribution command received from the current controller, and a voltage controller, connecting to the plurality of power converter modules, for generating a current command to the current controller, wherein the voltage controller generates a current command to the current controller of the power converter module according to the detected capacity and voltage of the DC power source, whereby the current controller generates the distribution command to the bi-directional DC to DC converter with the received current command.

The present invention discloses a first power converter module. The first power converter module comprises a bi-directional DC to DC converter, for charging or discharging a DC power source according to a distribution command received from a current controller, the current controller, connecting to the bi-directional DC to DC converter, for generating the distribution command according to the received current command, and a voltage controller, connecting to the current controller, for generating a current command to the current controller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
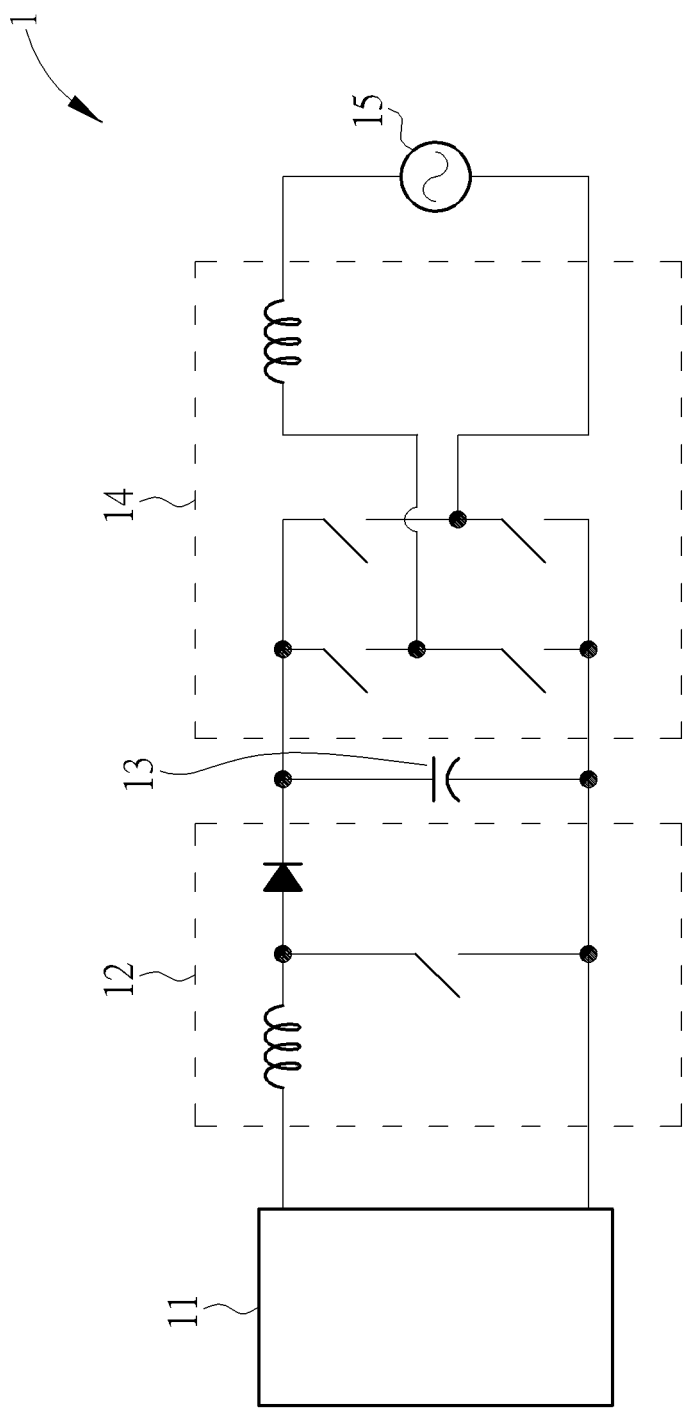
FIG. 1 is a schematic diagram of a power conversion system according to the prior art.
Figure 2:
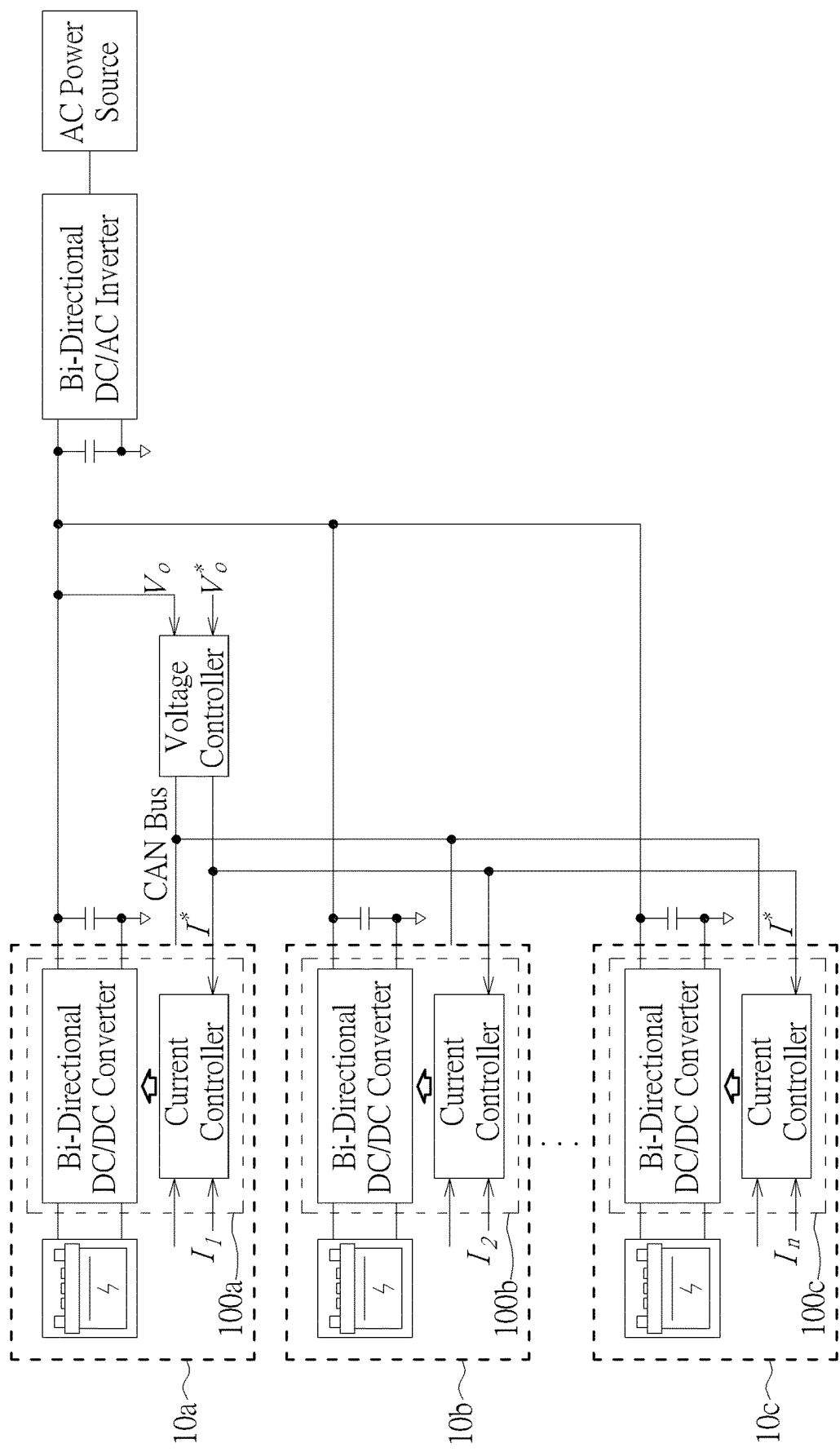
FIG. 2 is a schematic diagram of a power conversion system according to an embodiment of the present disclosure.

FIG. 2 is a schematic diagram of a power conversion system according to an embodiment of the present disclosure. The power conversion system comprises a plurality of power converter modules 100a-100c, a voltage controller, a bi-directional DC to AC inverter, multiple DC power sources 20a-20c (e.g. batteries of FIG. 2) and an AC power source (e.g. a power gird), wherein each power converter module 100a-100c includes a bi-directional DC to DC converter and a current controller. In addition, the power converter modules 100a-100c with DC power sources 20a-20c could be seen as power conversion units 10a-10c. The bi-directional DC to DC converter is connected to the current controller and the DC power source 20a-20c, and is used for charging or discharging the DC power source 20a-20c, so as to output a converted voltage Vo accordingly. The voltage controller is connected to the plurality of power converter modules 100a-100c, and is used for generating a current command I* for notifying the current controller to configure a charging/discharging current to the bi-directional DC to DC converter, so as to charge/discharge the DC power source 20a-20c, and therefore outputs a voltage higher/lower than an input voltage outputted from the DC power source 20a-20c.

The detailed description for the power converter module 100a-100c is as follows. The voltage controller obtains information about temperature and the capacity (i.e. an output current and an output voltage) of every DC power source 20a-20c by a controller area network (CAN) bus, and then generates a current command I* to every current controller with considering the capacity of every DC power source 20a-20c.

Every current controller detects the inductor current $I_1$, $I_2$, ... $I_n$ of the corresponding bi-directional DC to DC converter, and generates the distribution command $I_n$* to the bi-directional DC to DC converter according to the received current command I* and the detected inductor current. In an embodiment, the distribution command $I_n$* includes a discharge current factor or a charging current factor, whereby the bi-directional DC to DC converter inputs/outputs current from/to the DC power source 20a-20c according to the discharge current factor or a charging current factor, for charging/discharging the DC power source 20a-20c.

As abovementioned, every power converter module 100a-100c is applied with its own current controller, namely inner current loop control, but shares the same voltage controller. Moreover, the voltage controller generates a current command I* indicating a predefined voltage for each current controller to adjust the output voltage of the bi-directional DC to DC converter. Consequently, the current controller 102 conformed to the current command I* to control the bi-directional DC to DC converter to step up/step down the input voltage from the DC power source 20a-20c, so as to output the predefined voltage configured by the voltage controller. In other words, voltage adjustment of the paralleled power converter modules is realized by one current command I* with flow control, so the power conversion system is quite stable and the voltage adjustment is accurate.

To be more specific, due to different capacities of the DC power source 20a-20c, different charging/discharging currents are needed to be configured for the bi-directional DC to DC converter. The present invention provides that the voltage controller reads capacity of the DC power source 20a-20c (i.e. by the CAN bus), and notifies the current controllers of a demand output voltage associated to the capacity of the DC power source 20a-20c by the current command I*. Therefore, the current controller configures charging/discharging current to the bi-directional DC to DC converter by the distribution command $I_n^*$ with a charge current factor $k_{d\_batn}$ or charging current factor $k_{c\_batn}$. In an embodiment, the distribution command is represented as the following equation:

$$I_n^* = \begin{cases} I^* k_{d\_batn} & I^* > 0 \\ 0, & I^* = 0 \\ I^* k_{c\_batn} & I^* < 0 \end{cases} \quad (1)$$

After the bi-directional DC to DC converter receives the distribution command $I_n^*$ from the current controller with the charge current factor $k_{d\_batn}$ or charging current factor $k_{c\_batn}$, the bi-directional DC to DC converter charges/discharges the DC power source 20a-20c accordingly, and therefore outputs the predefined voltage $V_o^*$ as the following equation:

$$V_o^* = \begin{cases} 58.2 & V_{batn} \geq 58 \\ 54.2 & 58 > V_{batn} \geq 54 \\ 52, & 54 > V_{batn} \geq 50 \\ 48.5 & 50 > V_{batn} \geq 48 \\ 47.5 & 48 > V_{batn} \end{cases} \quad (2)$$

That is, the voltage controller controls the bi-directional DC to DC converter to output the predefined voltage $V_o^*$ with consideration of output voltage $V_{batn}$ of the DC power source 20a-20c. For example, if the output voltage $V_{batn}$ is greater than 58V, the voltage controller requests the bi-directional DC to DC converter to output 58.2V. If the output voltage $V_{batn}$ is smaller than 48V, the voltage controller requests the bi-directional DC to DC converter to output 47.5V. This is achieved by the current command I* transmitted to the current controller, and then the current controller conforms to the current command I* to generate the distribution command $I_n^*$ to the bi-directional DC to DC converter. Thus, the bi-directional DC to DC converter charges/discharges the DC power source 20a-20c, so as to step up/step down the output voltage of the DC power source 20a-20c.

Figure 3:
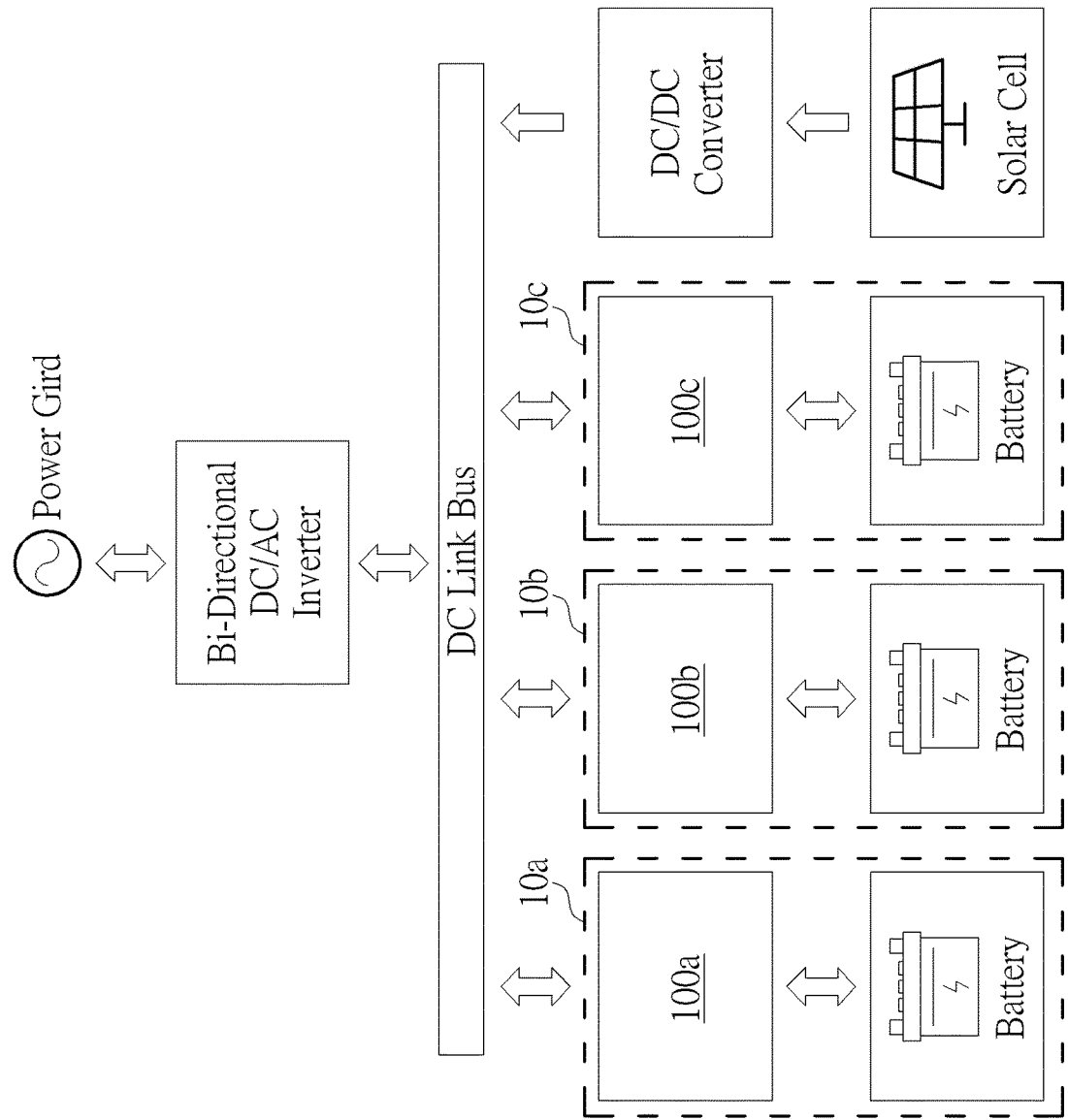
FIG. 3 is a schematic diagram of a framework of a power conversion system according to an embodiment of the present disclosure.

Reference is made to FIG. 3, which is a schematic diagram of a framework of a power conversion system according to an embodiment of the present disclosure. In FIG. 3, the power conversion units 10a-10c and are connected in parallel by a DC link bus to provide a stable voltage on the DC link bus. The DC link bus is connected to the bi-directional DC to AC inverter for connecting to the power grid. The power conversion units 10a-10c are used for charging or discharging power grid or battery, namely bi-directional charging and discharging. Note that, in an embodiment, the voltage controller is arranged in one of the plurality of the power conversion units 10a-10c (hereafter called master power conversion unit), and other power conversion units are called slave power conversion unit. The master power conversion unit collects information of the DC power source of the slave power conversion unit, and controls the charging and discharging mode of every bi-directional DC to DC converter of the slave power conversion unit. The detailed operation of the voltage controller and current controller could be referred from above, so it is omitted herein.

Figure 4:
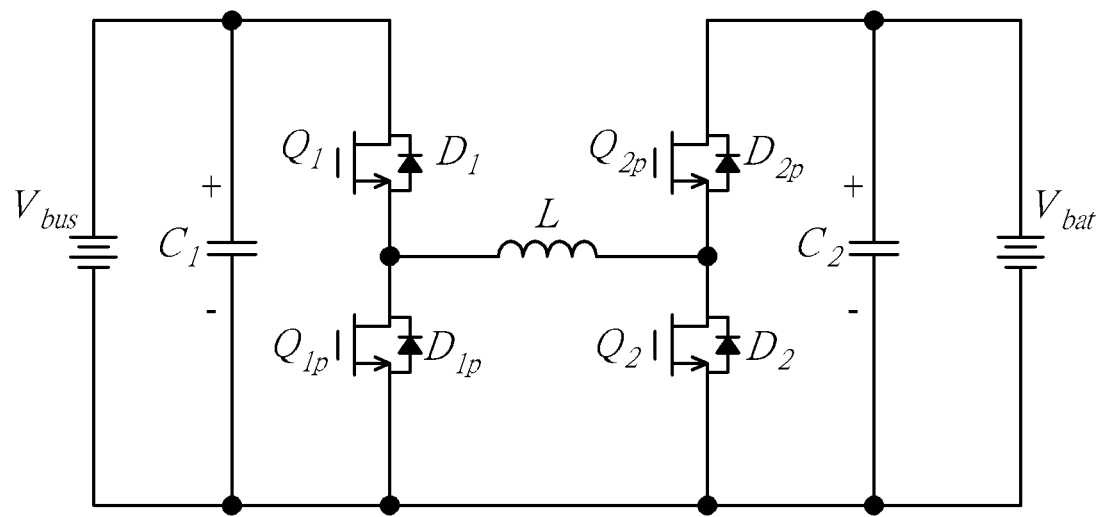
FIG. 4 is a schematic diagram of a bi-directional DC to DC converter in charging/discharging mode according to an embodiment of the present disclosure.

As abovementioned, the bi-directional DC to DC converter charges or discharges the battery/power grid based on the control of the current controller. The detailed description for charging/discharging operation of the bi-directional DC to DC converter is illustrated in FIGS. 4-8. As shown in FIG. 4, the bi-directional DC to DC converter includes four power switches $Q_1$, $Q_{1P}$, $Q_2$ and $Q_{2P}$ (e.g. MOSFETs), four diodes $D_1$, $D_{1P}$, $D_2$ and $D_{2P}$, one inductor L and two capacitors $C_1$ and $C_2$. One terminal of the bi-directional DC to DC converter is connected to the battery, marked as $V_{bat}$, and the other terminal of the bi-directional DC to DC converter is connected to the power grid with the DC link bus, marked as $V_{bus}$. By controlling the switches $Q_1$, $Q_{1P}$, $Q_2$ and $Q_{2P}$, the bi-directional DC to DC converter is switched between the charging mode and discharging mode.

In the charging mode, the direction of the current $i_L$ is transmitted from the power grid to the battery, such that the energy is stored in the battery. On the other hand, in the discharging mode, the direction of the current $i_L$ is transmitted from the battery to the power grid, such that the energy is stored in the power grid. Reference is made to FIGS. 5-8, which illustrate current flow of the bi-directional DC to DC converter 100 in charging/discharging mode according to an embodiment of the present disclosure.

Figure 5:
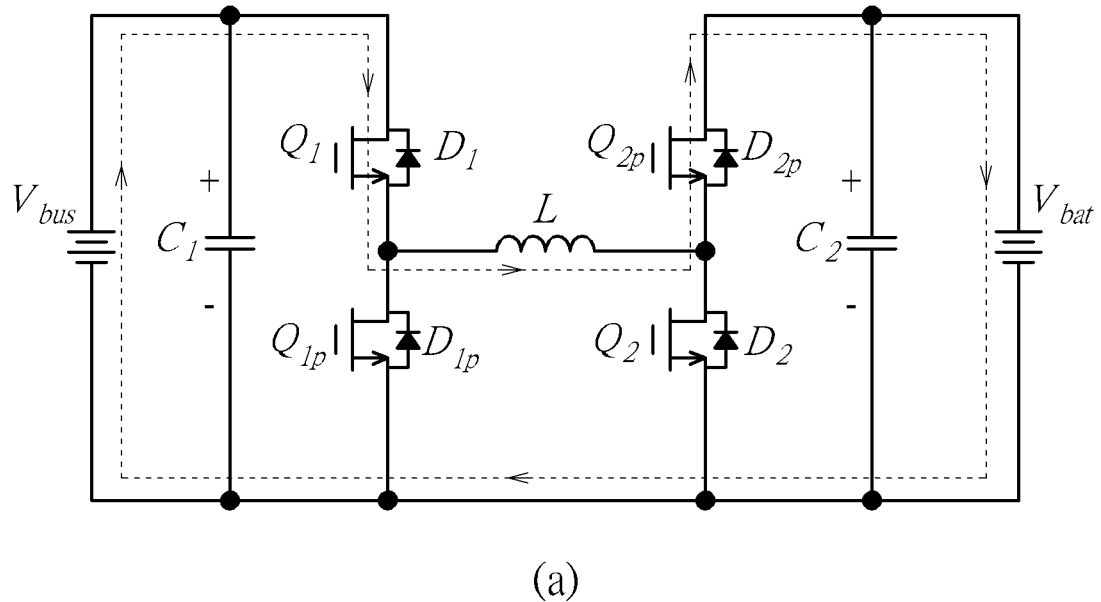
FIGS. 5-8 are schematic diagrams of a current flow of a bi-directional DC to DC converter in charging/discharging mode according to an embodiment of the present disclosure.
Figure 5:
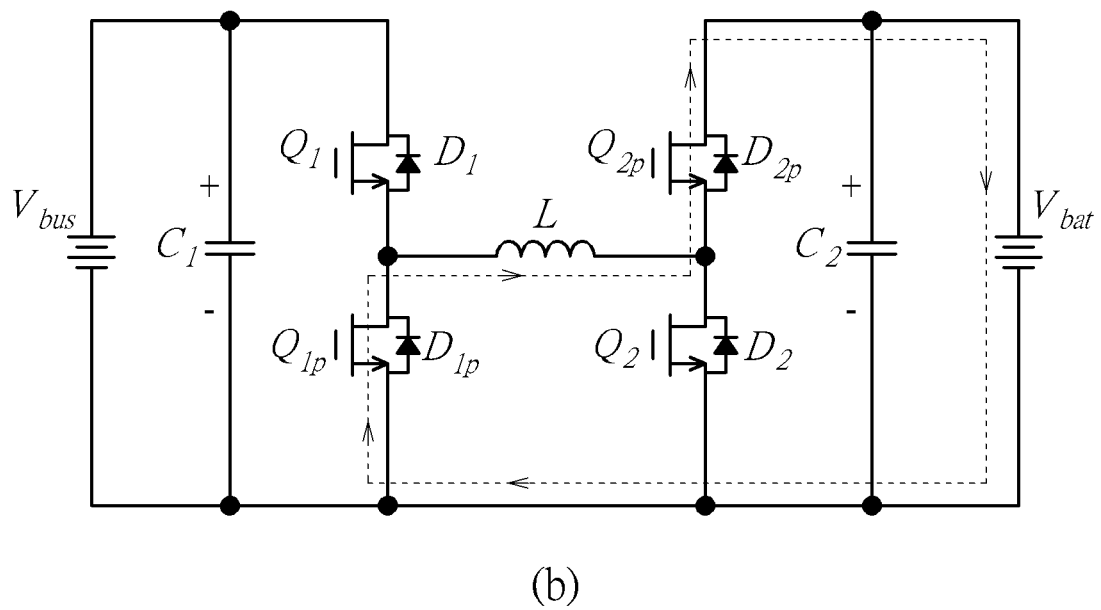
Figure 6:
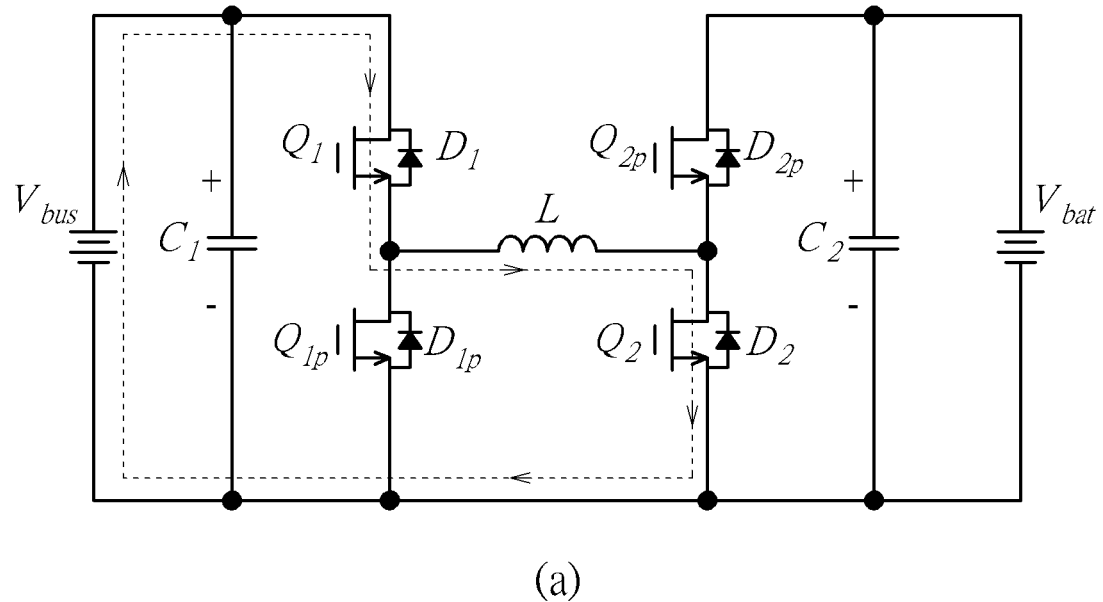
Figure 6:
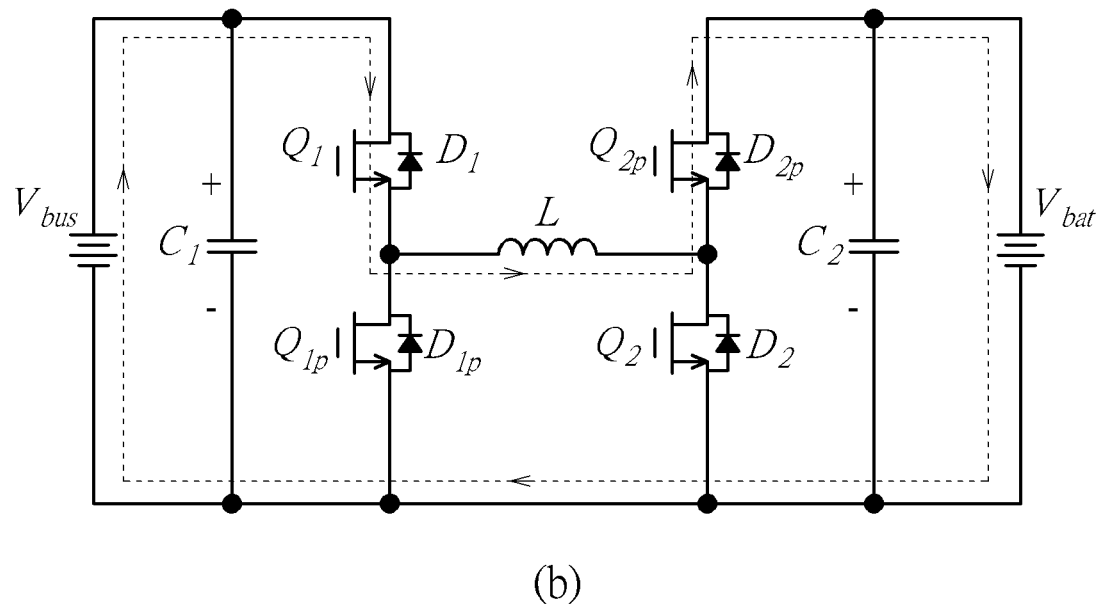

FIGS. 5-6 illustrate the charging mode of bi-directional DC to DC converter, where the power grid supplies power to the battery. In a case of that the voltage of the terminal $V_{bat}$ is lower than the voltage of the terminal $V_{bus}$, and the switch $Q_2$ is turned off, the switch $Q_1$ is turned on or off to adjust the buck charging current. In this case, the bi-directional DC to DC converter is worded as a buck converter, to output a step-down voltage. In addition, switches $Q_1$ and $Q_{1P}$ are complementary, such that the switch $Q_{1P}$ is synchronously switched to reduce the conduction loss flowing through the diode $D_1$ and $D_{1P}$. The charging step is as follows.

(a) When the switch $Q_1$ is turned on, the energy is stored in the inductor L, and the current path is $V_{bus}$-$Q_1$-L-$Q_{2P}$-$V_{bat}$-$V_{bus}$, as shown in FIG. 5(a);

(b) When the switch $Q_1$ is turned off, the energy stored in the inductor L is released to the battery, and thus the battery is charged. The current path is L-$Q_{2P}$-$V_{bat}$-$Q_{1P}$-L, as shown in FIG. 5(b).

In a case of that the voltage of the terminal $V_{bat}$ is equivalent to or higher than the voltage of the terminal $V_{bus}$, and the switch $Q_1$ is turned on, the switch $Q_2$ is turned on or off to adjust the boost charging current. In this case, the bi-directional DC to DC converter is worded as a boost converter, to output a step-up voltage. The charging step is as follows.

(a) When the switch $Q_2$ is turned on, the energy is stored in the inductor L, and the path of the current flowing is $V_{bus}$-$Q_1$-L-$Q_2$-$V_{bus}$, as shown in FIG. 6(a).

(b) When the switch $Q_2$ is turned off, the energy stored in the inductor L is released to the battery, and the battery is charged. The current path is $V_{bus}$-$Q_1$-L-$Q_{2P}$-$V_{bat}$-$V_{bus}$, as shown in FIG. 6(b).

Figure 7:
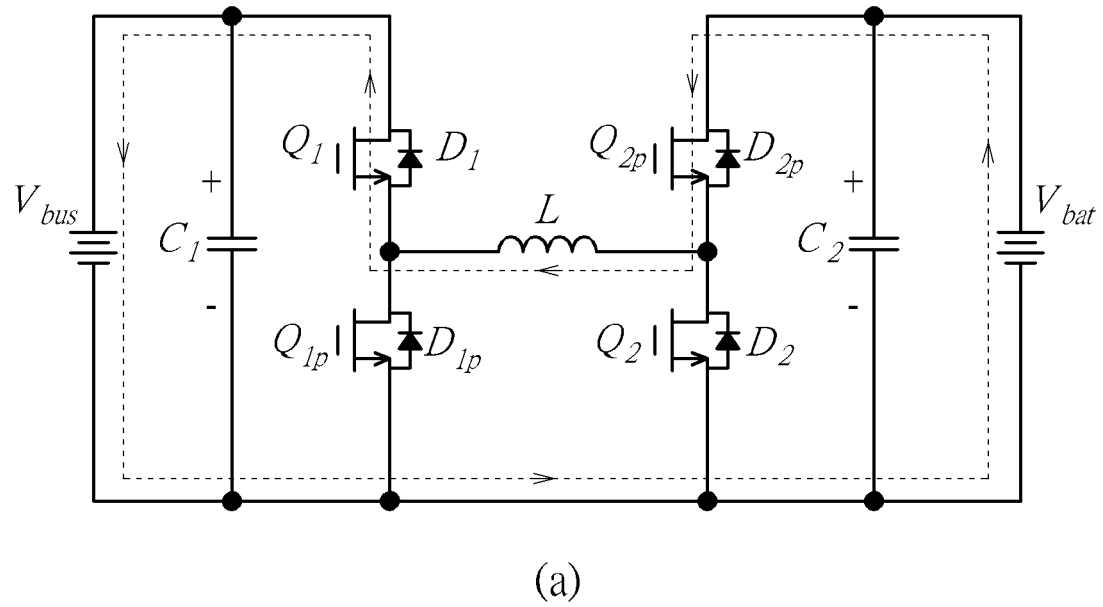
Figure 7:
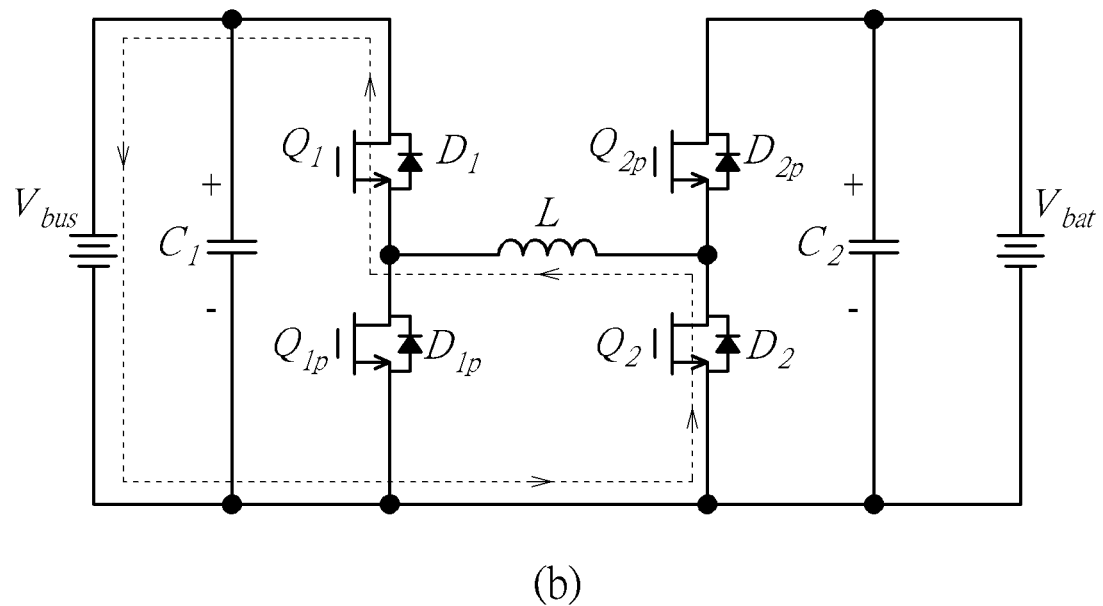
Figure 8:
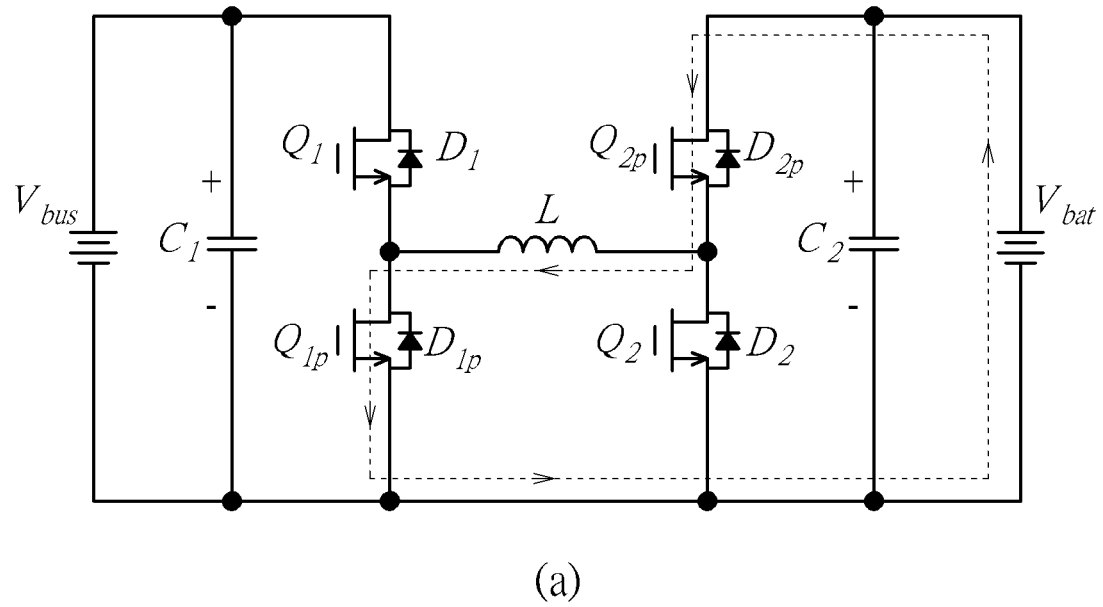
Figure 8:
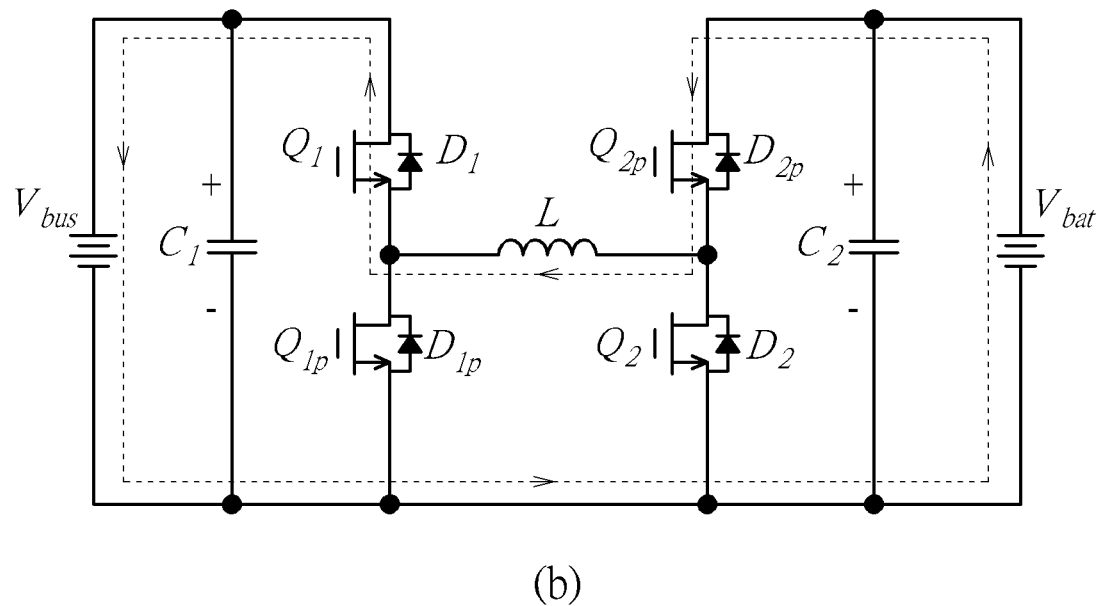

FIGS. 7-8 illustrate the discharging mode of bi-directional DC to DC converter, where the battery supplies the power to the power grid. For example, the power grid is in abnormal state and provides no power, such that the battery could be operated as a backup power for emergency. The discharging operation of the bi-directional DC to DC converter is realized by means of controlling the switches $Q_{1P}$ and $Q_{2P}$, where the switches $Q_1$ and $Q_2$ are synchronous to the switches $Q_{1P}$ and $Q_{2P}$.

In a case of that the voltage of the terminal $V_{bat}$ is larger than the voltage of the terminal $V_{bus}$, and the switch $Q_{1P}$ is turned off, the switch $Q_{2P}$ is turned on or off to adjust the buck discharging current. In this case, the bi-directional DC to DC converter is worked as a buck converter, to output a step-down voltage. The discharging step is as follows.

(a) When the switch $Q_{2P}$ is turned on, the energy is stored in the inductor L, and the current path is $V_{bat}$-$Q_{2P}$-L-$Q_1$-$V_{bus}$-$V_{bat}$, as shown in FIG. 7(a);

(b) When the switch $Q_{2P}$ is turned off, the energy stored in the inductor L is released to the power grid, and the current path is L-$Q_1$-$V_{bus}$-$Q_2$-L, as shown in FIG. 7(b).

In a case of that the voltage of the terminal $V_{bus}$ is equivalent to or higher than the voltage of the terminal $V_{bat}$, and the switch $Q_{2P}$ is turned on, the switch $Q_{1P}$ is turned on or off to adjust the boost discharging current. In this case, the bi-directional DC to DC converter is worked as boost converter, to output a step-up voltage. The discharging step is as follows.

(a) When the switch $Q_{1P}$ is turned on, the energy is stored on the inductor L, and the current path is $V_{bat}$-$Q_{2p}$-L-$Q_{1P}$-$V_{bat}$, as shown in FIG. 8(a);

(b) When the switch $Q_1$ is turned off, the energy stored in the inductor L is released to the power grid, and the current path is $V_{bat}$-$Q_{2P}$-L-$Q_1$-$V_{bus}$-$V_{bat}$, as shown in FIG. 8(b).

In an embodiment, the switches $Q_1$, $Q_{1P}$, $Q_2$ and $Q_{2P}$ could be controlled by the current controller with a pulse width modulation, PWM, manner, so as to realize charging/discharging operation. Thus, the bi-directional DC to DC converter outputs step-up or step-down voltage in accordance with the predefined voltage configured in the power conversion system.

Figure 9:
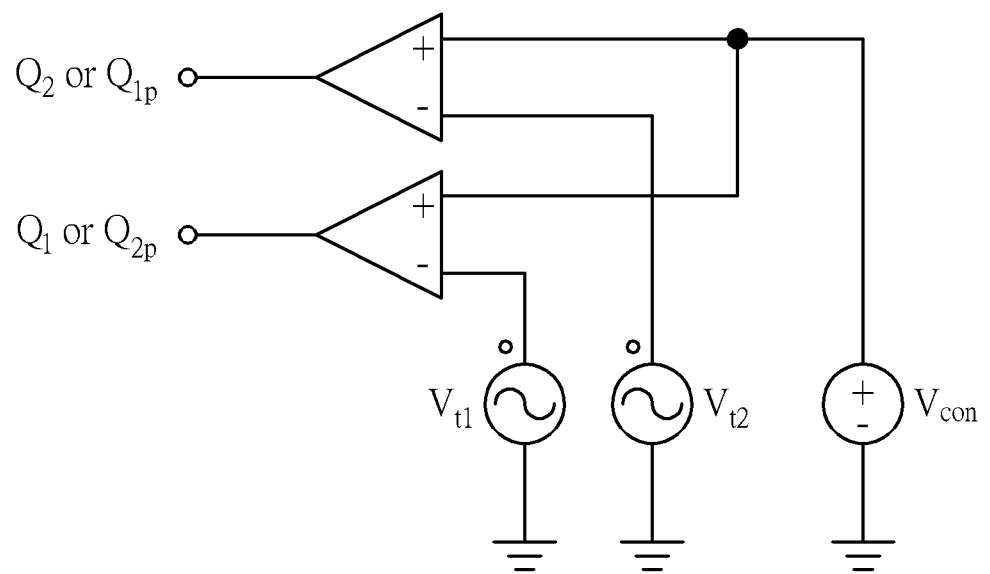
FIG. 9 is a schematic diagram of a with a PWM circuit according to an embodiment of the present disclosure.

As can be seen from above, the bi-directional DC to DC converter enters the buck state by controlling the conduction state of the switch $Q_1$ or $Q_{2p}$, and enters the boost state by controlling the conduction state of the switches $Q_2$ or $Q_{1p}$. Reference is made to FIG. 9, which is a schematic diagram of a PWM circuit according to an embodiment of the present disclosure. As shown in FIG. 9, the compactor is utilized for comparing the lower triangular wave $V_{t1}$ and the control voltage $V_{con}$ (calculating the difference between the real output voltage and the predefined output voltage of the bi-directional DC to DC converter, to obtain the control voltage $V_{con}$), to get PWM signal for controlling the switch $Q_1$ or $Q_{2p}$, and comparing the upper triangular wave $V_{t2}$ and the control voltage $V_{con}$ to get PWM signal for controlling the switch $Q_2$ or $Q_{1p}$. In an example, if the control voltage $V_{con}$ is 0-1, the bi-directional DC to DC converter is in the buck state, whereas if the control voltage $V_{con}$ is 1-2, the bi-directional DC to DC converter is in the boost state. The PMW technique for switch control should be well known in the art, so it is omitted herein.

Figure 10:
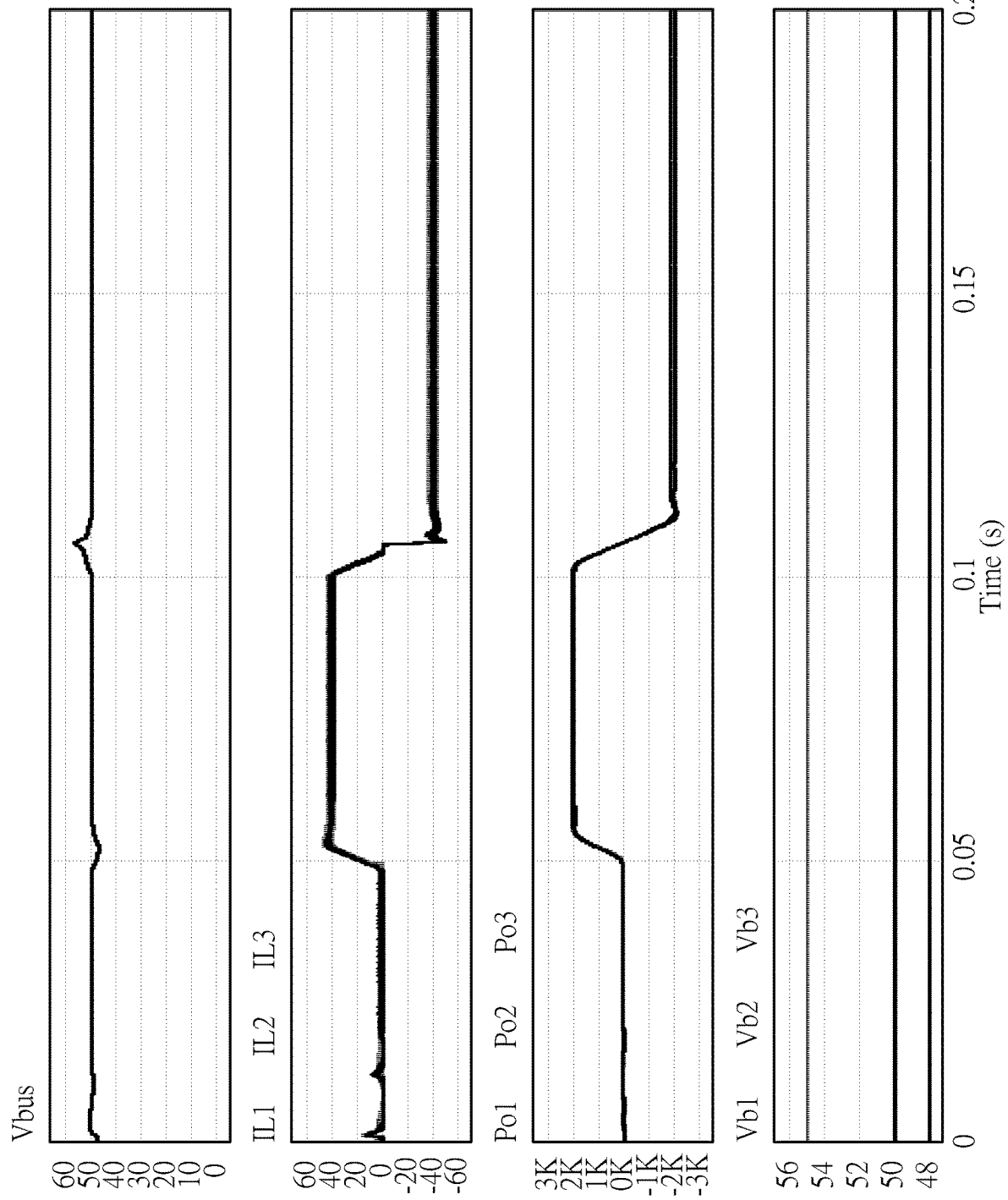
FIG. 10 is a schematic diagram of power change according to an embodiment of the present disclosure.

To verify the feasibility of the proposed circuit structure, three batteries of the proposed power converter modules in a set of 3 kW/48V are connected in parallel. Reference is made to FIG. 10, which is a schematic diagram of power change according to an embodiment of the present disclosure. The battery voltages are set to $V_{b1}$=50V, $V_{b2}$=48V, $V_{b3}$=55V, as shown in FIG. 10(d) and the battery power is changed from Po=10 W to Po=6 kW, and then to Po=−6 kW, as shown in FIG. 10(c). It can be seen that the voltages on the DC link bus, $V_{bus}$, are finally regulated at 50V, as shown in FIG. 10(a), where the three bi-directional DC to DC converters are provided with the same current $I_{L1}$=$I_{L2}$=$I_{L3}$, as shown in FIG. 10(b).

In conclusion, the present invention addresses a power converter module with inner current loop control. In detail, one voltage controller is used for control multiple bi-directional DC to DC converter via current controllers each corresponding to a bi-directional DC to DC converter, such that multiple DC power sources could be charged or discharged at the same time to output converted voltages, and thus reducing the response time in the power conversion system. In addition, different types or capacities of battery could be coupled in parallel, to improve the flexibility of power supply combinations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power conversion system comprising:
a plurality of power converter modules, each including a bi-directional DC to DC converter and a current controller, wherein the bi-directional DC to DC converter is connected to the current controller, for charging and discharging a DC power source at a first moment and a second moment, respectively, according to a distribution command received from the current controller, and the current controller of the each power converter module is different from another current controller of another power converter module; and
a voltage controller, connecting to the plurality of power converter modules, for generating a current command to the current controller;
wherein the voltage controller generates a current command to the current controller of the power converter module according to the detected capacity and voltage of the DC power source, whereby the current controller generates the distribution command to the bi-directional DC to DC converter with the received current command.

2. The power conversion system of claim 1, wherein the voltage controller is further used for detecting a capacity of the DC power source and an output voltage of the bi-directional DC to DC converter, and generating the current command to the current controller according to the detected capacity and the output voltage.

3. The power conversion system of claim 2, wherein the voltage controller detects a temperature and the capacity of the DC power source via a controller area network (CAN) bus, and the capacity includes an output voltage and an output current of the DC power source.

4. The power conversion system of claim 1, wherein the current controller generates the distribution command according to the received current command and an inductor current detected from bi-directional DC to DC converter.

5. The power conversion system of claim 1, wherein the distribution command includes a discharge current factor or a charging current factor.

6. The power conversion system of claim 5, wherein the bi-directional DC to DC converter outputs a predefined voltage according to the discharge current factor or the charging current factor of the distribution command.

7. The power conversion system of claim 1, wherein the bi-directional DC to DC converter is switched between a charging mode and a discharging mode with a pulse width modulation, PWM, circuit controlled by the current controller.

8. A first power converter module comprising:
a bi-directional DC to DC converter, for charging and discharging a DC power source at a first moment and a second moment, respectively, according to a distribution command received from a current controller;
the current controller, connecting to the bi-directional DC to DC converter, for generating the distribution command according to the received current command; and
a voltage controller, connecting to the current controller, for generating a current command to the current controller;
wherein the current controller of the first power converter module is different from another current controller of another power converter module, and the another power converter module comprises another bi-directional DC to DC converter for charging and discharging another DC power source at the first moment and the second moment, respectively.

9. The first power converter module of claim 8, wherein the voltage controller is further used for connecting to a second power converter module and used for transmitting the current command to the second power converter module.

10. The first power converter module of claim 8, wherein the voltage controller is further used for detecting a capacity of the DC power source and an output voltage of the bi-directional DC to DC converter, and generating the current command to the current controller according to the detected capacity and the output voltage.

11. The first power converter module of claim 10, wherein the voltage controller detects a temperature and the capacity of the DC power source via a controller area network (CAN) bus, and the capacity includes an output voltage and an output current of the DC power source.

12. The first power converter module of claim 8, wherein the current controller generates the distribution command according to the received current command and an inductor current detected from bi-directional DC to DC converter.

13. The first power converter module of claim 8, wherein the distribution command includes a discharge current factor or a charging current factor.

14. The first power converter module of claim 13, wherein the bi-directional DC to DC converter outputs a predefined voltage according to the discharge current factor or the charging current factor of the distribution command.

15. The first power converter module of claim 8, wherein the bi-directional DC to DC converter is switched between a charging mode and a discharging mode with a pulse width modulation, PWM, circuit controlled by the current controller.

* * * * *